United States Patent
Ouyang et al.

(10) Patent No.: US 10,643,641 B1
(45) Date of Patent: May 5, 2020

(54) METHODS AND APPARATUSES FOR LOCALIZED ANNEALING OF SLIDERS CONFIGURED FOR HEAT ASSISTED MAGNETIC RECORDING

(71) Applicant: Western Digital Technologies, Inc., San Jose, CA (US)

(72) Inventors: Bin Ouyang, Pathum Thani (TH); Takuya Matsumoto, San Jose, CA (US); Utis Cumhnoo, Pathum Thani (TH); Mousumi Mani Biswas, Redwood City, CA (US); Ozgun Suzer, San Jose, CA (US); Marc A Finot, Palo Alto, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/370,772

(22) Filed: Mar. 29, 2019

(51) Int. Cl.
| | | |
|---|---|---|
| *G11B 11/105* | (2006.01) | |
| *G11B 5/012* | (2006.01) | |
| *G11B 5/48* | (2006.01) | |
| G11B 5/00 | (2006.01) | |
| G11B 7/126 | (2012.01) | |
| G11B 5/60 | (2006.01) | |

(52) U.S. Cl.
CPC ............ *G11B 5/012* (2013.01); *G11B 5/4826* (2013.01); *G11B 5/6088* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,514,673 B1 | 8/2013 | Zhao et al. | |
| 8,848,495 B1 * | 9/2014 | Wu ...................... | G11B 5/3133 |
| | | | 369/13.33 |
| 8,917,581 B1 * | 12/2014 | Mallary ................. | G11B 5/314 |
| | | | 369/13.33 |
| 9,218,830 B2 * | 12/2015 | Wu ...................... | G11B 5/3163 |
| | | | 369/13.33 |
| 9,286,931 B2 | 3/2016 | Jayashankar et al. | |
| 9,291,560 B2 | 3/2016 | Peng et al. | |
| 9,607,638 B1 | 3/2017 | Olson et al. | |

(Continued)

OTHER PUBLICATIONS

Kryder, Mark et al; "Heat Assisted Magnetic Recording"; Proceedings of the IEEE; vol. 96; No. 11; Nov. 2008; https://ieeexplore.ieee.org/abstract/document/4694026; 27 pages.

*Primary Examiner* — Tan X Dinh
(74) *Attorney, Agent, or Firm* — Loza & Loza, LLP; Gabriel Fitch

(57) ABSTRACT

A slider for heat assisted magnetic recording (HAMR) is provided. The slider includes a writer for writing data to a HAMR medium, a reader for reading data stored on the HAMR medium, a near field transducer (NFT), a first waveguide optically coupled to the NFT, a slider laser configured to generate and transmit a first light energy to the first waveguide such that the NFT causes a portion of the HAMR medium to heat up, to assist the writer for writing data to the HAMR medium, and a second waveguide optically coupled to the NFT, for transmitting a light energy from an external laser to the NFT to optically anneal the NFT during a fabrication process of the slider.

20 Claims, 12 Drawing Sheets

PROFILE VIEW

(56) References Cited

U.S. PATENT DOCUMENTS

| | | | |
|---|---|---|---|
| 9,799,359 B1 | 10/2017 | Olson et al. | |
| 9,960,570 B1* | 5/2018 | Goggin | H01S 5/14 369/13.33 |
| 2014/0376340 A1 | 12/2014 | Cheng et al. | |
| 2015/0170675 A1* | 6/2015 | Shimazawa | G11B 5/314 369/13.33 |
| 2015/0194261 A1* | 7/2015 | Litvinov | H01F 41/22 369/13.33 |
| 2015/0318003 A1* | 11/2015 | Cheng | G11B 5/3116 369/13.33 |
| 2016/0125898 A1* | 5/2016 | Ren | G11B 5/314 369/13.33 |
| 2016/0329068 A1 | 11/2016 | Matsumoto et al. | |
| 2017/0221511 A1* | 8/2017 | Dai | G11B 5/41 369/13.33 |

* cited by examiner

PLAN VIEW

PROFILE VIEW

PROFILE VIEW

PROFILE VIEW

PROFILE VIEW

PROFILE VIEW

PROFILE VIEW

PROFILE VIEW

PROFILE VIEW

PROFILE VIEW

AIR BEARING SURFACE (ABS) VIEW

AIR BEARING SURFACE (ABS) VIEW

METHODS AND APPARATUSES FOR LOCALIZED ANNEALING OF SLIDERS CONFIGURED FOR HEAT ASSISTED MAGNETIC RECORDING

INTRODUCTION

In heat assisted magnetic recording (HAMR) technology, a portion of a recording medium may be heated above its Curie temperature (Tc) using a laser. The laser generated heat may be guided to the medium using a near-field transducer (NFT) placed near the inductive write head. As the medium cools, writing is then carried out during the refreezing process. Because the bit transitions are determined by the thermal gradients, as opposed to just the write field gradients, much higher linear/track densities can be achievable with HAMR as opposed to previous magnetic recording technologies.

However, the heat that is generated by the laser during writing may cause regions and parts of the slider that includes an NFT to deform and/or expand, resulting in an unstable slider, which can cause unreliable writing of data on the recording medium. As such, there is a need to stabilize the slider so that reliable writing of data on the recording medium can be achieved.

SUMMARY

An apparatus for optically annealing a slider configured for heat assisted magnetic recording (HAMR) is provided. The apparatus includes a slider and an external means for generating light energy. The slider includes a writer for writing data to a HAMR medium; a reader for reading data stored on the HAMR medium; a near field transducer (NFT); first means for transmitting light energy, wherein the first means for transmitting light energy is optically coupled to the NFT; means for generating a first light energy, wherein the means for generating the first light energy is configured to generate and transmit the generated first light energy to the first means for transmitting light energy such that the NFT causes a portion of the HAMR medium to heat up; and second means for transmitting light energy, wherein the second means for transmitting light energy is optically coupled to the NFT; and means for optical coupling coupled to the second means for transmitting light energy. The external means for generating the light energy is configured to generate and transmit the generated light energy to the means for optical coupling, such that the generated light energy travels through the second means for transmitting light and to the NFT, where the generated light energy is sufficient to anneal the NFT.

A method for optically annealing a slider is provided. The method provides a slider that includes a writer for writing data to a heat assisted magnetic recording (HAMR) medium; a reader for reading data stored on the HAMR medium; a near field transducer (NFT); a first waveguide optically coupled to the NFT; a slider laser configured to generate and transmit a first light energy to the first waveguide such that the NFT causes a portion of the HAMR medium to heat up, to assist the writer for writing data to the HAMR medium; and a second waveguide optically coupled to the NFT. The method generates and transmits, from an external laser, a light energy to the second waveguide, such that the generated light energy travels to the NFT, and where the generated light energy anneals the NFT.

A slider for heat assisted magnetic recording (HAMR) is provided. The slider includes a writer for writing data to a HAMR medium; a reader for reading data stored on the HAMR medium; a near field transducer (NFT) configured to cause a portion of the HAMR medium to heat up when a first light energy is received, to assist the writer for writing data to the HAMR medium, wherein the NFT includes an annealed portion that has a grain size that is about 5 to 20 percent greater than a non-annealed NFT of the same composition; a first waveguide optically coupled to the NFT; and a second waveguide optically coupled to the NFT, for transmitting a light energy from an external laser to the NFT to optically anneal the NFT during a fabrication process of the slider.

DETAILED DESCRIPTION

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The present disclosure describes methods and apparatuses for fabricating a slider for heat assisted magnetic recording (HAMR), where a portion of the slider has been optically annealed. The slider includes a writer for writing data to a HAMR medium, a reader for reading data stored on the HAMR medium, a near field transducer (NFT), a first waveguide optically coupled to the NFT, a slider laser configured to generate and transmit a first light energy to the first waveguide such that the NFT causes a portion of the HAMR medium to heat up, to assist the writer for writing data to the HAMR medium, and a second waveguide optically coupled to the NFT, for transmitting a light energy from an external laser to the NFT to optically anneal the NFT during a fabrication process of the slider. The slider may include a grating coupler optically coupled to the second waveguide. The slider may be integrated with a storage device (e.g., hard drive, disk drive) that includes the HAMR medium. Part of the slider, such as a portion of the NFT near or about an air bearing surface (ABS) of the slider, may be annealed.

Exemplary Slider for Storage Device

Figure 1:
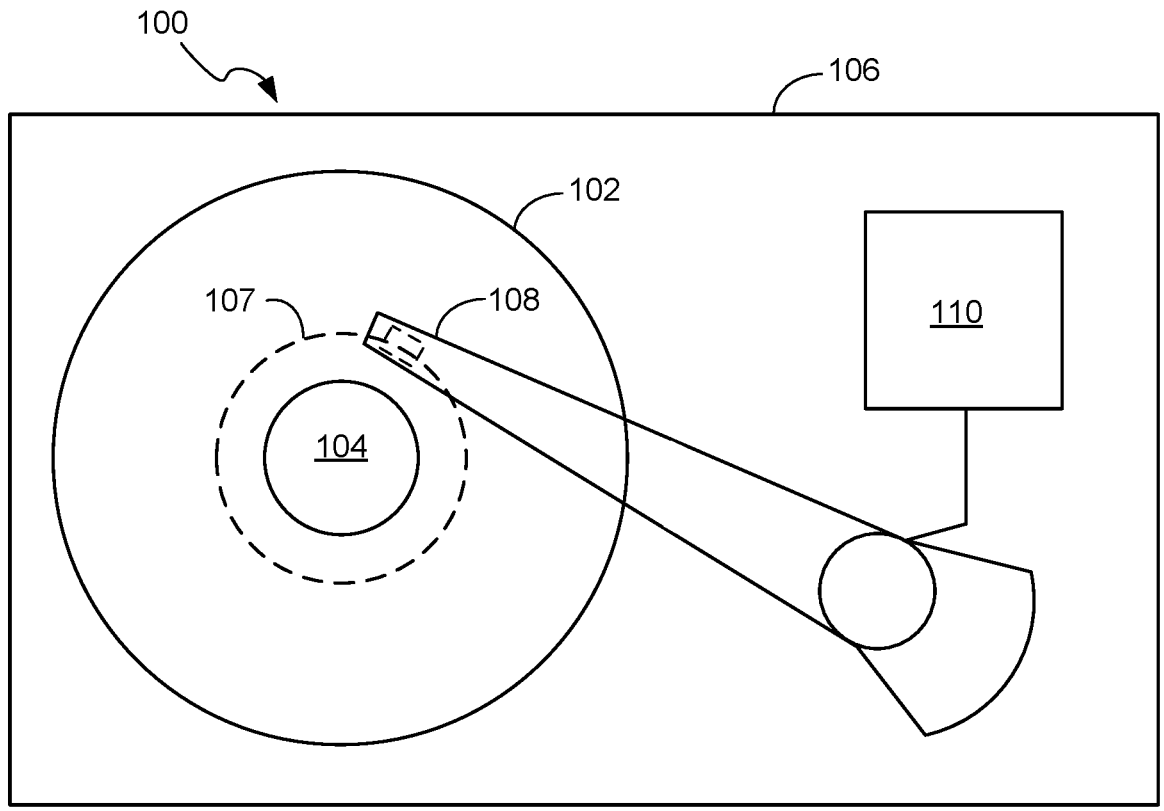
FIG. 1 illustrates a top plan view of a disk drive configured for heat assisted magnetic recording (HAMR) in accordance with an embodiment of the disclosure.

FIG. 1 illustrates a plan view of a disk drive 100 configured for heat assisted magnetic recording (HAMR). The disk drive 100 includes one or more media 102, a spindle assembly 104, a drive housing 106, a slider 108 and a circuitry 110. The slider 108 may include a slider head. The slider 108 may be used to position a laser (not shown in FIG. 1). The one or more media 102 may be configured to store data. The media 102 may be a magnetic recording medium, such as a heat assisted magnetic recording (HAMR) medium. The media 102 may be a media disk. The media 102 may be a means for storing data. The media 102 is positioned on the spindle assembly 104 that is mounted to the drive housing 106. Data may be stored along tracks in the magnetic recording layer of the media 102. The reading and writing of data are accomplished with a read element and a write element located with the slider 108. The write element is used to alter the properties of the magnetic recording layer of the media 102 and thereby write information thereto. In an implementation, the slider 108 may include an inductive read/write head or a Hall effect head.

During an operation of the disk drive 100, a spindle motor (not shown) rotates the spindle assembly 104, and thereby rotates the media 102. The slider 108 and a laser (not shown) may be positioned over the media 102 at a particular location along a desired disk track 107. The positions of the slider 108 and the laser, relative to the media 102 may be controlled by a position control circuitry 110.

Figure 2:
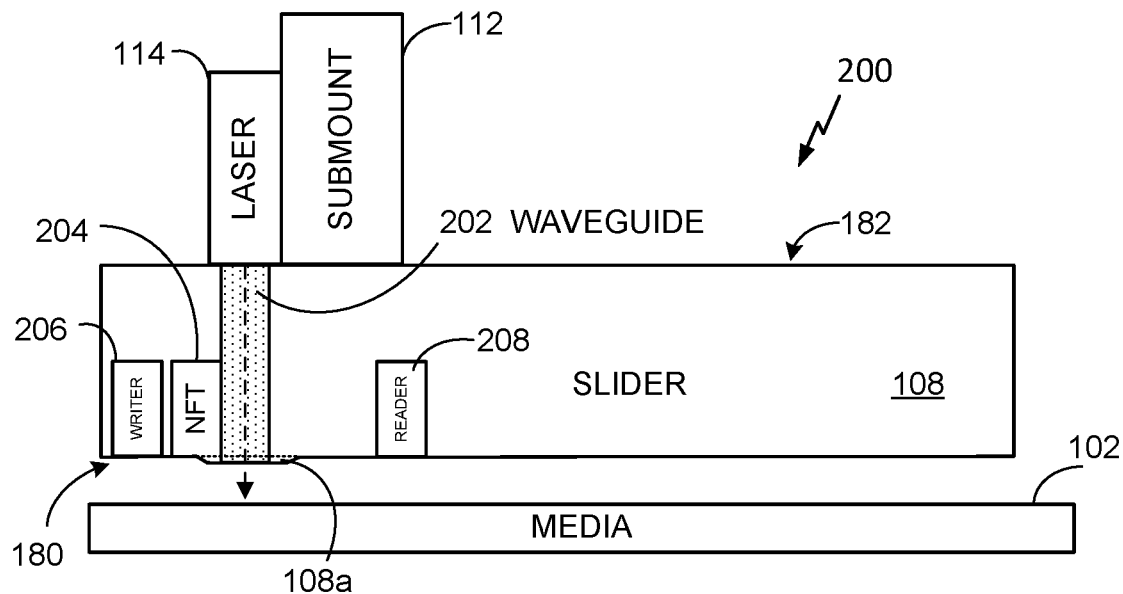
FIG. 2 illustrates a profile view of a slider and HAMR magnetic medium in accordance with an embodiment of the disclosure.

FIG. 2 illustrates a profile view of the slider 108 and the HAMR medium of FIG. 1. In particular, FIG. 2 illustrates an assembly 200 that includes the slider 108, a sub-mount 112, a laser 114, a waveguide 202, a near-field transducer (NFT) 204, a writer 206 and a reader 208. The assembly 200 is positioned over the media 102, which may be a HAMR medium. The slider 108 may be one component or several components. The slider 108 may include a slider and a slider head. In some implementations, a slider head may be a separate component that may be integrated with the slider 108. The sub-mount 112, the laser 114, the waveguide 202, the NFT 204, the writer 206 and the reader 208 may be implemented in the slider, the slider head or combinations thereof.

The slider 108 includes a first surface 180 (e.g., bottom surface) that faces the media 102. The first surface 180 may be referred to as an air bearing surface (ABS). The slider 108 also includes a second surface 182 (e.g., top surface) that faces away from the media 102. The sub-mount 112 is coupled to the second surface 182 of the slider 108. The laser 114 is coupled to the sub-mount 112, and possibly to the slider 108. The waveguide 202, the NFT 204, the writer 206 and the reader 208 may be located near or along the ABS 180 of the slider 108. The writer 206 may be a writing element (e.g., means for writing data) for writing data on the media 102, and the reader 208 may be a reading element (e.g., means for reading data) for reading data on the media 102. The writer 206 may include a writing pole/writer pole.

The laser 114 may be a means for generating light energy. The laser 114 is configured to generate and transmit light energy (e.g., laser beam) to the waveguide 202. The waveguide 202 directs the light energy to and/or near the NFT 204, which is near the ABS 180 of the slider 108. Upon receiving and/or being near the light energy, the NFT 204 may cause a portion of the media 102 to heat up, and/or the light energy traveling through the waveguide may heat a portion of the media 102. For example, upon receiving and/or being near the light energy, the NFT 204 may generate a localized heat energy that heats a portion of the media. Thus, the light energy may travel through the waveguide 202 such that the NFT 204 emits heat to a portion of the media. During the process of heating the media 102, the light energy from the laser 114 and the heat energy from the NFT 204 may also heat the region around the waveguide 202 and/or the NFT 204 near and along the ABS 180 of the slider 108. The result of the heat on the slider 108 is an expansion and/or deformation of certain materials and/or components of the slider 108.

FIG. 2 illustrates a protrusion 108a (e.g., plastic protrusion) from the slider 108 from the ABS 180 near and around the waveguide 202 and/or the NFT 204. The protrusion 108a may be caused by the light energy from the laser 114 and/or the heat energy from the NFT 204. The protrusion 108a may include part of the slider 108, part of the waveguide 202 and/or part of the NFT 204. It is noted that different implementations may result in the protrusion 108a having different sizes and/or shapes. For example, the protrusion 108a may include part of the writer 206 and/or part of the reader 208.

The protrusion 108a extends the ABS 180 towards the media 102, thus reducing the clearance or gap between the slider 108 and the media 102, which can destabilize the position of the slider 108 over the media 102. For example, the protrusion 108a may cause the slider 108 to move up and down, instead of having a near constant height over the media 102. In some implementations, the protrusion 108a may possibly touch the media 102.

In addition, components near the localized heat during the operation of the disk drive 100 may be prone or subject to thermally activated failure, which ultimately leads to failure of the disk drive 100. To address the issues of (i) a protrusion that can cause instability in the slider 108 and/or (ii) thermally activated or induced failure in components, portions of the slider 108 may be annealed to toughen and strengthen areas that may be exposed to heating. The annealing process (e.g., a localized optical annealing process) may change the chemical and/or physical characteristics of materials and/or components, making the materials and/or components tougher and more resistant to deformation when the disk drive 100 is operational (e.g., when the laser 114 is in use). In some implementations, the annealing process (in connection with possibly other processes) may result in less deformation than would otherwise occur without the annealing process. As will be further described below, portions of the slider may be pre-heated by an external laser, which may cause expansion of the slider (including components of the slider), and then any resulting expansion or protrusion may be removed (e.g., through a lapping process). The result, is a slider 108 that over time, has an ABS 180 that stays flatter and/or smoother, resulting in a more stable slider 108 (e.g., less vertical movement, less up and down movements) over the media 102 during an operation of the disk drive 100. Moreover, the pre-heating of portions of the slider may provide portions that are more heat resistant. For example, pre-heating of portions of the slider may provide components of the slider that are denser (e.g., gold densification), oxidized at interfaces between components and/or materials, and initial diffused, which brings components and/or portions of the slider to a more stable state than the pre-annealed state. The result is that these annealed components and/or annealed portions of the slider are less likely to fail for thermally related causes or from thermal stresses during the operation of the disk drive 100.

Exemplary processes for fabricating a slider with localized annealing are described in FIGS. 14A-14B and 16-17. However, before describing such processes, exemplary sliders with localized annealed regions are described below.

Exemplary Sliders with Localized Annealed Regions

FIGS. 3-12 illustrate several examples of assemblies that include sliders with annealed regions. The sliders have flatters and/or smoother surfaces (e.g., flatter and/or smother air bearing surfaces) resulting in more stable sliders during an operation of a storage device (e.g., hard drive). Moreover, as will be further described below, some parts and/or regions of the sliders are annealed providing for parts and regions that are tougher and more resistant to heat and heat deformation, which also may provide more stable sliders during an operation of the storage device. The assemblies shown in FIGS. 3-12 may be implemented in the disk drive 100 of FIG. 1. The positions of the various components with the slider 108 are exemplary. Different implementations may have components with different positions in the slider 108. Moreover, the shapes and sizes of the various components of the slider are exemplary. Different implementations may have components with different shapes and sizes than the one shown in FIGS. 3-12. The sliders shown in FIGS. 3-12 may be fabricated using the processes described in FIGS. 14A-14B and 16-17.

Figure 3:
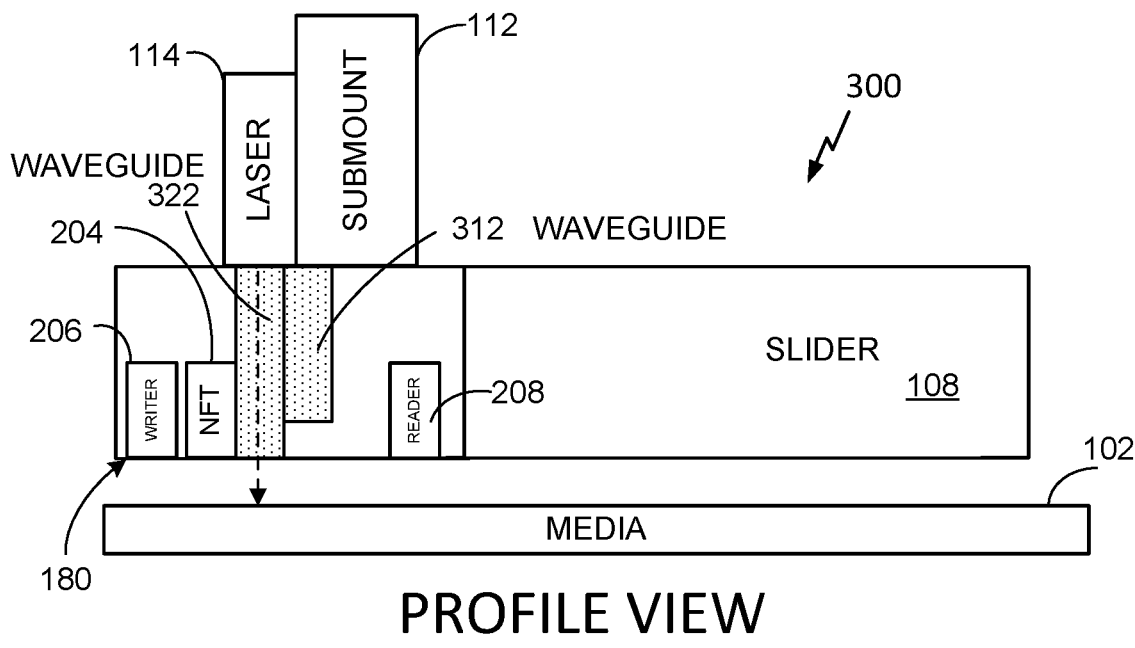
FIG. 3 illustrates a profile view of another slider and HAMR magnetic medium in accordance with an embodiment of the disclosure.

FIG. 3 illustrates a profile view (e.g., side view) of an assembly 300 that includes the slider 108, the sub-mount 112, the laser 114, the waveguide 312 (e.g., first waveguide), a waveguide 322 (e.g., second waveguide), the NFT 204, the writer 206 and the reader 208. The assembly 300 may be similar to the assembly 200. During an operation of the disk drive 100, the laser 114 may generate and transmit a light energy through the waveguide 322 (e.g., means for transmitting light energy) and possibly to the NFT 204. During an operation of the disk drive 100, the waveguide 312 (e.g., means for transmitting light energy) may be an inactive waveguide. That is, in some implementations, the waveguide 312 may not be required for the disk drive 100 to properly operate. In some implementations, during an operation of the disk drive 100, the waveguide 312 may considered as a dummy waveguide.

It is noted that the components shown in FIG. 3 (and other figures in the disclosure) may represent actual representations or logical representations of the components of a slider. As such, the configurations, shapes, sizes and/or locations of these components are not necessarily indicative of the actual configurations, shapes, sizes and/or positions of these components. Moreover, the terms first and second as used in the disclosure are used arbitrarily and are not necessarily indicative of an order. For example, the waveguide 312 may be considered as a first waveguide or a second waveguide, and the waveguide 322 may be considered as a first waveguide or a second waveguide.

During a fabrication process of the slider 108, the waveguide 312 may be used to anneal portions of the slider 108, such as the NFT 204. More specifically, an external laser may generate and transmit a light energy to the waveguide 312 and the NFT 204, which generates heat energy that anneals portions of the slider 108. The annealed portion generally includes the NFT 204, and may potentially include the waveguide 312, the writer 206, the reader 208, and/or the waveguide 322. At least some of the annealed portion(s) are then removed, creating a slider 108 that has a relatively flat and/or smooth surface (e.g., air bearing surface (ABS)). In this example, the ABS 180 of the slider 108 has a flat and/or smooth surface without a substantial protrusion. Because a region of the slider 108 is subjected to heat energy, and is thereby annealed (e.g., pre-heated), the annealed region (including components within the region) is stronger, more resilient and thus less likely to protrude, expand, and/or fail when the laser 114 generates and transmits a light energy through the waveguide 322.

The annealing process may affect components differently, depending on the materials and/or material composition of the components and/or the type of external laser used. Annealing may affect grain size (e.g., grain growth), defects (e.g., annihilation of defect), oxidation, trapped gases and moisture (e.g., elimination of trapped gases and/or moistures), impurities, density, hardness, thermal conductivity, and/or electrical resistivity of the components. In some implementations, the annealing process may cause one or more components or portions of components to have (i) an increase in grain size (e.g., grain growth) by up to about 20 percent (e.g., 5-20 percent), (ii) a decrease in resistivity (e.g., electrical resistivity) in a range of about 10-30 percent, (iii) an increase in density in a range of about 10-20 percent, (iv) an increase in thermal conductivity in a range of about 10-30 percent, and/or (v) an increase in hardness in a range of about 10-30 percent.

As an example, the NFT 204 may include gold, a gold alloy, or other suitable composition of materials as are known in the art. After an annealing process, some or all of the gold of the NFT 204 may have (i) an increase in grain size (e.g., grain growth) by up to about 20 percent (e.g., 5-20 percent) relative to a non-annealed gold, (ii) a decrease in resistivity (e.g., electrical resistivity) in a range of about 10-30 percent relative to a non-annealed gold, (iii) an increase in density in a range of about 10-20 percent relative to a non-annealed gold, (iv) an increase in thermal conductivity in a range of about 10-30 percent relative to a non-annealed gold, and/or (v) an increase in hardness in a range of about 10-30 percent relative to a non-annealed gold. While these changes in characteristics are described in relation to an NFT composition including gold, they may also be applicable to NFT's having other compositions.

Figure 4:
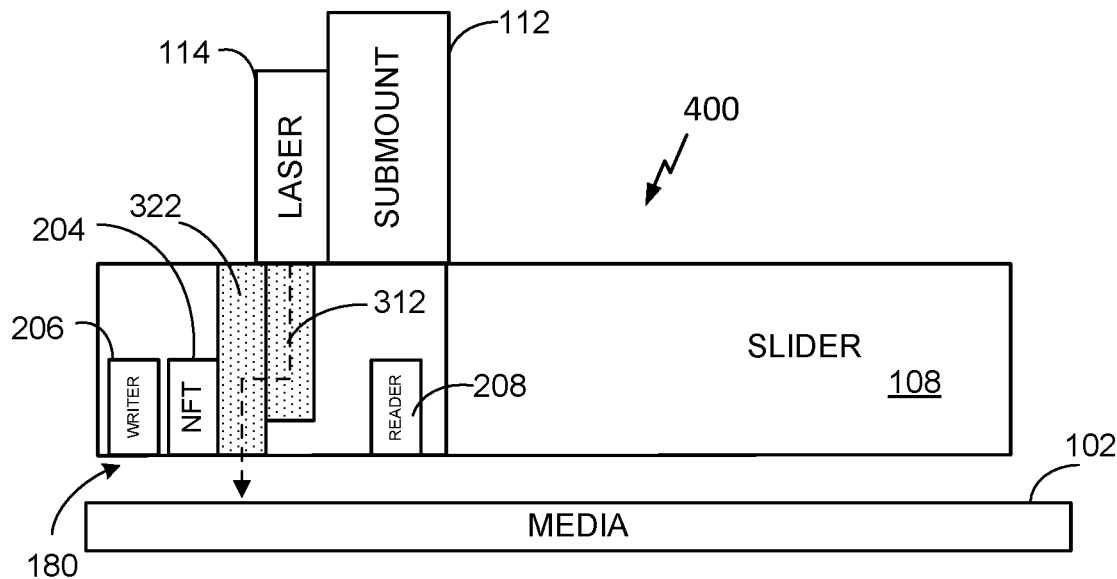
FIG. 4 illustrates a profile view of another slider and HAMR magnetic medium in accordance with an embodiment of the disclosure.

FIG. 4 illustrates a profile view of another assembly 400 that includes the slider 108, the sub-mount 112, the laser 114, the waveguide 312, the waveguide 322, the NFT 204, the writer 206 and the reader 208. The assembly 400 may be similar to the assembly 300. FIG. 4 illustrates that laser 114 is positioned such that a light energy from the laser 114 is transmitted through the waveguide 312 and the waveguide 322, and near and/or to the NFT 204. Thus, in FIG. 4, the light energy from the laser 114 may follow a different path than the path shown in the assembly 300. Thus, portions (e.g., first portion, top portion) of the waveguide 322 may not be used during an operation of the disk drive 100.

The waveguide 322 may be used to anneal portions of the slider 108. During a fabrication process of the slider 108, an external laser may generate and transmit a light energy to the waveguide 322 and the NFT 204, which generates heat energy that anneals portions of the slider 108. The annealed portion includes potentially the waveguide 312, the NFT 204, the writer 206, the reader 208, and/or the waveguide 322. At least some of the annealed portion(s) are then removed, creating a slider 108 that has a relatively flat and/or smooth surface (e.g., air bearing surface (ABS)). The ABS 180 of the slider 108 has a flat and/or smooth surface without a substantial protrusion.

Figure 5:
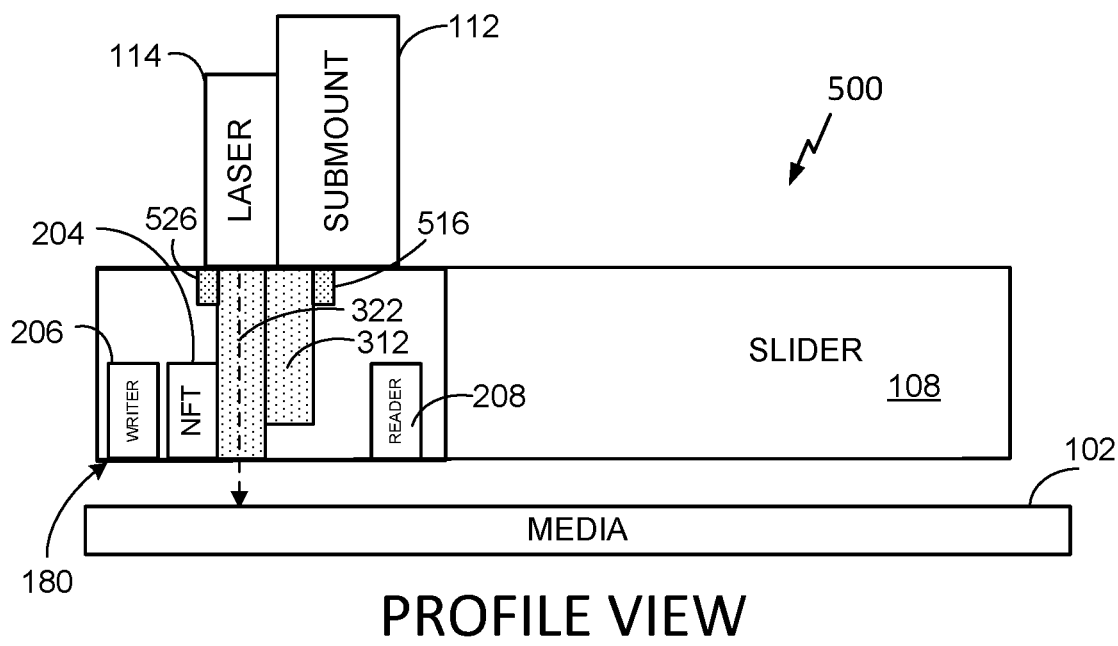
FIG. 5 illustrates a profile view of another slider and HAMR magnetic medium in accordance with an embodiment of the disclosure.

FIG. 5 illustrates a profile view of another assembly 500 that includes the slider 108, the sub-mount 112, the laser 114, the waveguide 312, a grating coupler 516 (e.g., first grating coupler), the waveguide 322, a grating coupler 526 (e.g., second grating coupler), the NFT 204, the writer 206 and the reader 208. The assembly 500 may be similar to the assembly 300. During an operation of the disk drive 100, the laser 114 may generate and transmit a light energy through the grating coupler 526 and the waveguide 322, and near and/or to the NFT 204. In some implementations, the light energy from the laser 114 may bypass the grating coupler 526 and be transmitted to the waveguide 322 from the laser 114. During an operation of the disk drive 100, the waveguide 312 may be an inactive waveguide. That is, in some implementations, the waveguide 312 may not be required for the disk drive 100 to operate. In some implementations, during an operation of the disk drive 100, the waveguide 312 may considered as a dummy waveguide.

The grating coupler 516 and the waveguide 312 may be used to anneal portions of the slider 108. During a fabrication process of the slider 108, an external laser may generate and transmit a light energy through the grating coupler 516 and the waveguide 312, and to the NFT 204, which generates heat energy that anneals portions of the slider 108. The annealed portion includes potentially the waveguide 312, the NFT 204, the writer 206, the reader 208, and/or the waveguide 322. At least some of the annealed portion(s) are then removed, creating a slider 108 that has a relatively flat and/or smooth surface (e.g., air bearing surface (ABS)). The ABS 180 of the slider 108 has a flat and/or smooth surface without a substantial protrusion.

Figure 6:
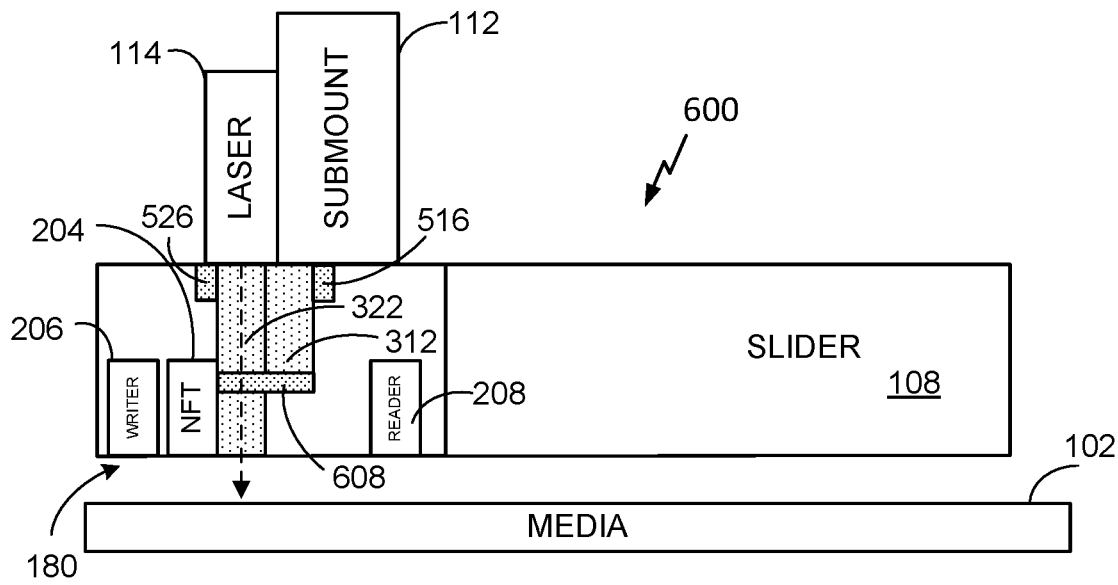
FIG. 6 illustrates a profile view of another slider and HAMR magnetic medium in accordance with an embodiment of the disclosure.

FIG. 6 illustrates a profile view of another assembly 600 that includes the slider 108, the sub-mount 112, the laser 114, the waveguide 312, the grating coupler 516, the waveguide 322, the grating coupler 526, a splitter 608, the NFT 204, the writer 206 and the reader 208. The assembly 600 may be similar to the assembly 500. During an operation of the disk drive 100, the laser 114 may send a light energy through the grating coupler 526, the waveguide 322, the splitter 608 (e.g., means for splitting light energy), and to the NFT 204. In some implementations, the light energy from the laser 114 may bypass the grating coupler 526 and be transmitted to the waveguide 322 from the laser 114. During an operation of the disk drive 100, the waveguide 312 may be an inactive waveguide. That is, in some implementations, the waveguide 312 may not be required for the disk drive 100 to operate.

The grating coupler 516, the waveguide 312, the splitter 608 and portions of the waveguide 322 may be used to anneal portions of the slider 108. During a fabrication process of the slider 108, an external laser may generate and transmit a light energy through the grating coupler 516, the waveguide 312, the splitter 608 and portions of the waveguide 322, and to the NFT 204, which generates heat energy that anneals portions of the slider 108. The annealed portion includes potentially the waveguide 312, the NFT 204, the writer 206, the reader 208, and/or the waveguide 322. At least some of the annealed portion(s) are then removed, creating a slider 108 that has a relatively flat and/or smooth surface (e.g., air bearing surface (ABS)). The ABS 180 of the slider 108 has a flat and/or smooth surface without a substantial protrusion.

Figure 7:
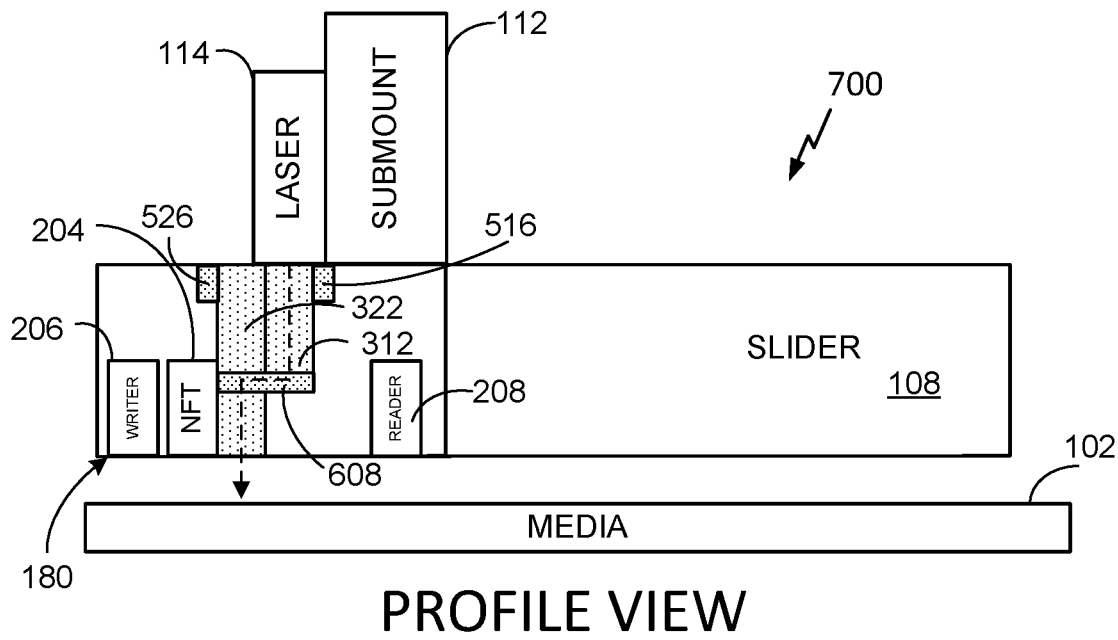
FIG. 7 illustrates a profile view of another slider and HAMR magnetic medium in accordance with an embodiment of the disclosure.

FIG. 7 illustrates a profile view of another assembly 700 that includes the slider 108, the sub-mount 112, the laser 114, the waveguide 312, the grating coupler 516, the waveguide 322, the grating coupler 526, the splitter 608, the NFT 204, the writer 206 and the reader 208. The assembly 700 may be similar to the assembly 600. During an operation of the disk drive 100, the laser 114 may send a light energy through the grating coupler 516, the waveguide 312, the splitter 608, portions of the waveguide 322, and to the NFT 204. In some implementations, the light energy from the laser 114 may bypass the grating coupler 516 and be transmitted to the waveguide 312 from the laser 114. During an operation of the disk drive 100, portions of the waveguide 322 may be an inactive waveguide. That is, in some implementations, portions of the waveguide 322 may not be required for the disk drive 100 to properly operate.

The grating coupler 526, the waveguide 322, the splitter 608 may be used to anneal portions of the slider 108. During a fabrication process of the slider 108, an external laser may generate and transmit a light energy through the grating coupler 526, the waveguide 322, the splitter 608, and to the NFT 204, which generates heat energy that anneals portions of the slider 108. The annealed portion includes potentially the waveguide 312, the NFT 204, the writer 206, the reader 208, and/or the waveguide 322. At least some of the annealed portion(s) are then removed, creating a slider 108 that has a relatively flat and/or smooth surface (e.g., air bearing surface (ABS)). The ABS 180 of the slider 108 has a flat and/or smooth surface without a substantial protrusion.

Figure 8:
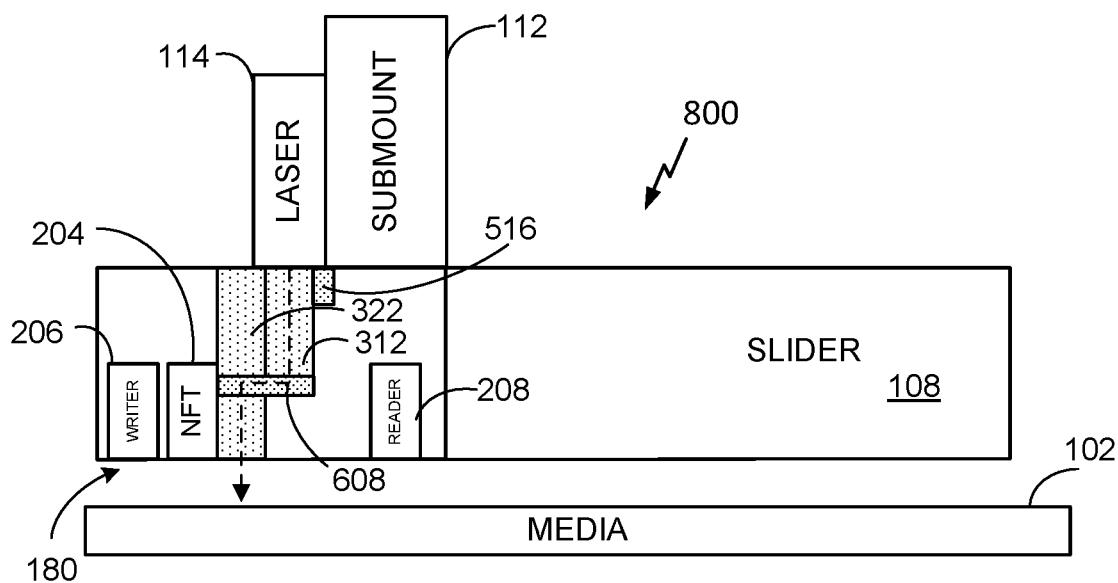
FIG. 8 illustrates a profile view of another slider and HAMR magnetic medium in accordance with an embodiment of the disclosure.

FIG. 8 illustrates a profile view of another assembly 800 that includes the slider 108, the sub-mount 112, the laser 114, the waveguide 312, the waveguide 322, the grating coupler 516, the splitter 608, the NFT 204, the writer 206 and the reader 208. The assembly 800 may be similar to the assembly 700. The assembly 800 may operate in a similar manner as the assembly 700. The assembly 800 may be fabricated in a similar manner as the assembly 700. The assembly 800 does not include the grating coupler 526. The grating coupler 526 may have been removed during a fabrication of the slider 108.

Figure 9:
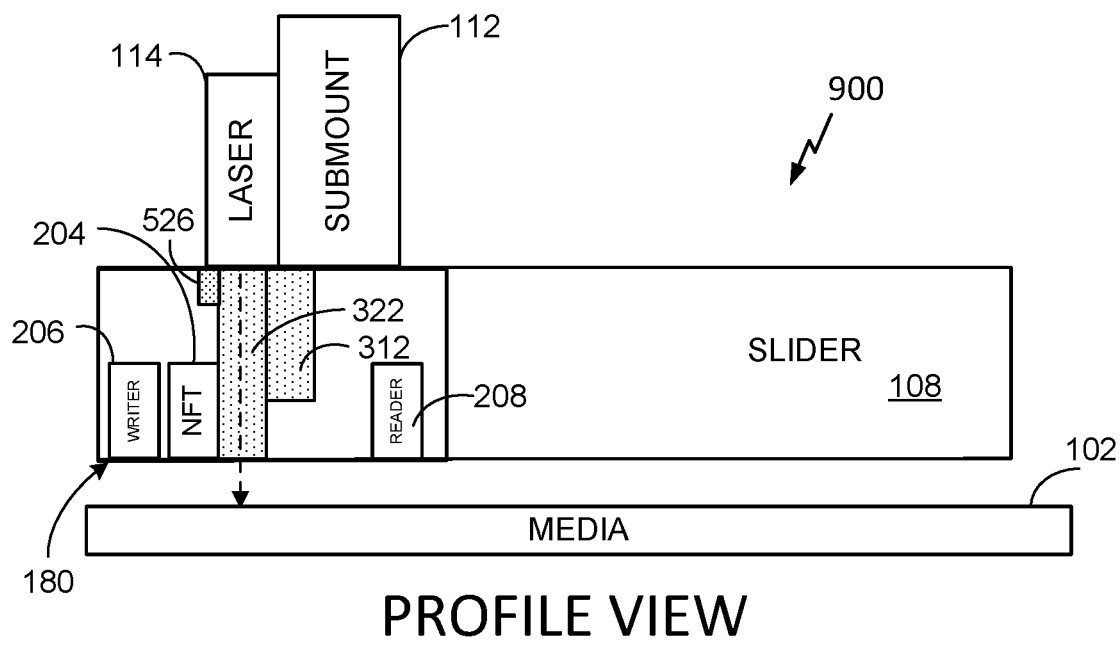
FIG. 9 illustrates a profile view of another slider and HAMR magnetic medium in accordance with an embodiment of the disclosure.

FIG. 9 illustrates a profile view of another assembly 900 that includes the slider 108, the sub-mount 112, the laser 114, the waveguide 312, the grating coupler 526, the waveguide 322, the splitter 608, the NFT 204, the writer 206 and the reader 208. The assembly 900 may be similar to the assembly 500. The assembly 900 may operate in a similar manner as the assembly 500. The assembly 900 may be fabricated in a similar manner as the assembly 500. The assembly 900 does not include the grating coupler 516. The grating coupler 516 may have been removed during a fabrication of the slider 108.

Figure 10:
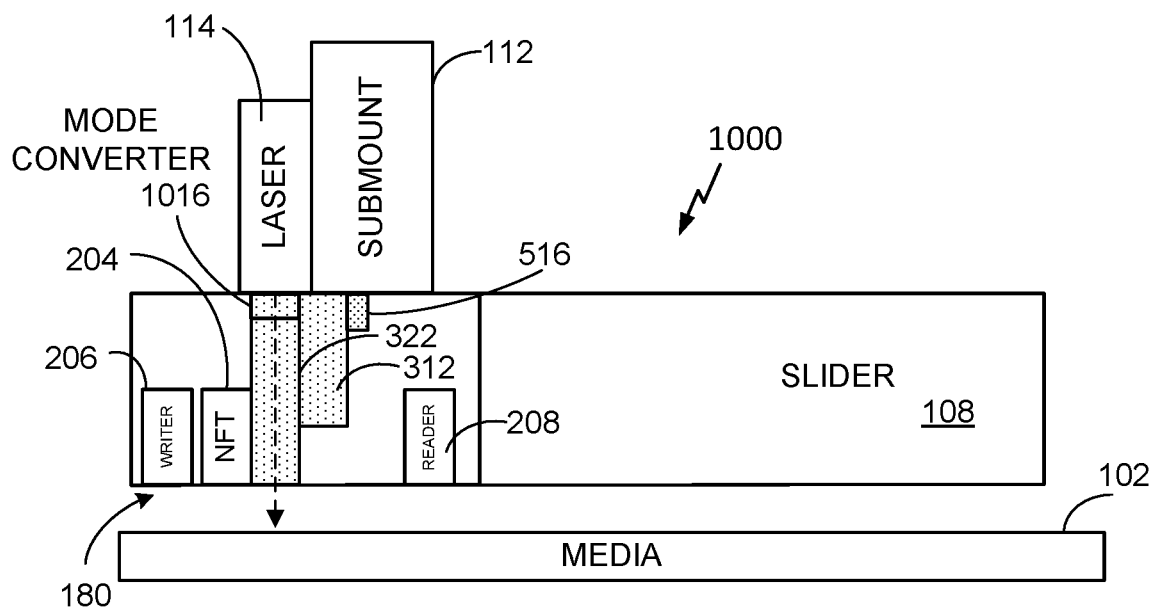
FIG. 10 illustrates a profile view of another slider and HAMR magnetic medium in accordance with an embodiment of the disclosure.

FIG. 10 illustrates a profile view of another assembly 1000 that includes the slider 108, the sub-mount 112, the laser 114, the waveguide 312, the waveguide 322, a mode converter 1016, the grating coupler 516, the splitter 608, the NFT 204, the writer 206 and the reader 208. The assembly 1000 may be similar to the assembly 500. The assembly 1000 may operate in a similar manner as the assembly 500. The assembly 1000 may be fabricated in a similar manner as the assembly 500. The assembly 1000 does not include a grating coupler 526. The grating coupler 526 may have been removed during a fabrication of the slider 108.

The mode converter 1016 may be an optical component that is coupled to the waveguide 322. The laser 114 may emit and transmit a light energy through the mode converter 1016 and the waveguide 322. The mode converter 1016 may be an optical device or optical component that is configured to convert light energy from a first mode to a second mode. For example, a light energy in a first mode may be transmitted from the laser 114, and the mode converter 1016 may convert the light energy to a second mode, which is then transmitted though the waveguide 322. The mode converter 1016 may be coupled to any of the waveguides described in the disclosure. In some implementations, the mode converter 1016 may be used in conjunction with a grating coupler. For example, a mode converter 1016 may be located between a grating coupler and a waveguide. In some implementations, a mode converter may be implemented with the slider and then subsequently removed during a fabrication of the slider.

Figure 11:
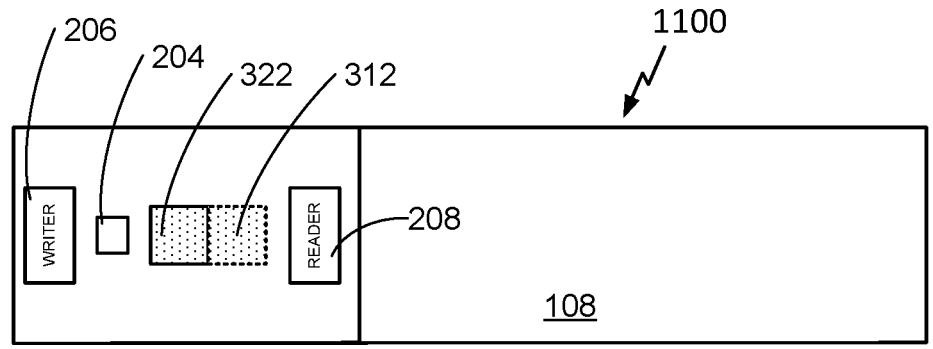
FIG. 11 illustrates an air bearing surface (ABS) view of another slider and HAMR magnetic medium in accordance with an embodiment of the disclosure.
Figure 12:
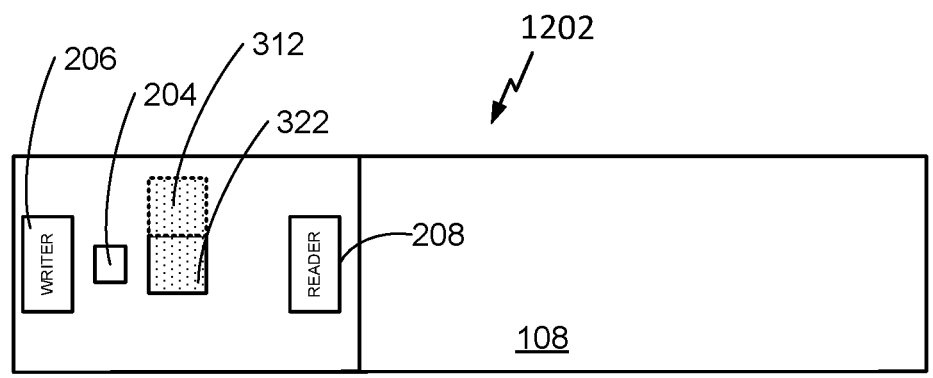
FIG. 12 illustrates an air bearing surface (ABS) view of another slider and HAMR magnetic medium in accordance with an embodiment of the disclosure.

FIGS. 11 and 12 illustrate plan views (e.g., air bearing surface (ABS) views) of assemblies that include the slider 108. The assembly 1100 includes the slider 108, the waveguide 312 (as projected to the ABS), the waveguide 322, the splitter 608, the NFT 204, the writer 206 and the reader 208. In FIG. 11, the waveguide 312 and the waveguide 322 are located and aligned along a length of the slider 108. The assembly 1200 includes the slider 108, the waveguide 312, the waveguide 322, the splitter 608, the NFT 204, the writer 206 and the reader 208. In FIG. 12, the waveguide 312 and the waveguide 322 are located and aligned along a width of the slider 108. It is noted that the components shown in FIGS. 11 and 12 (and other figures in the disclosure) may represent actual representations or logical representations of the components of a slider. As such, the configurations, shapes, sizes and/or locations of these components are not necessarily indicative of the actual configurations, shapes, sizes and/or positions of these components. For example, the waveguide 312 and/or the waveguide 322 may not reach the ABS 180 of the slider 108. It is noted that the positions of the waveguide 312 and the waveguide 322 may vary with different implementations. The assembly 1100 and the assembly 1200 may represent plan views of any of the assemblies described in the disclosure.

Figure 13:
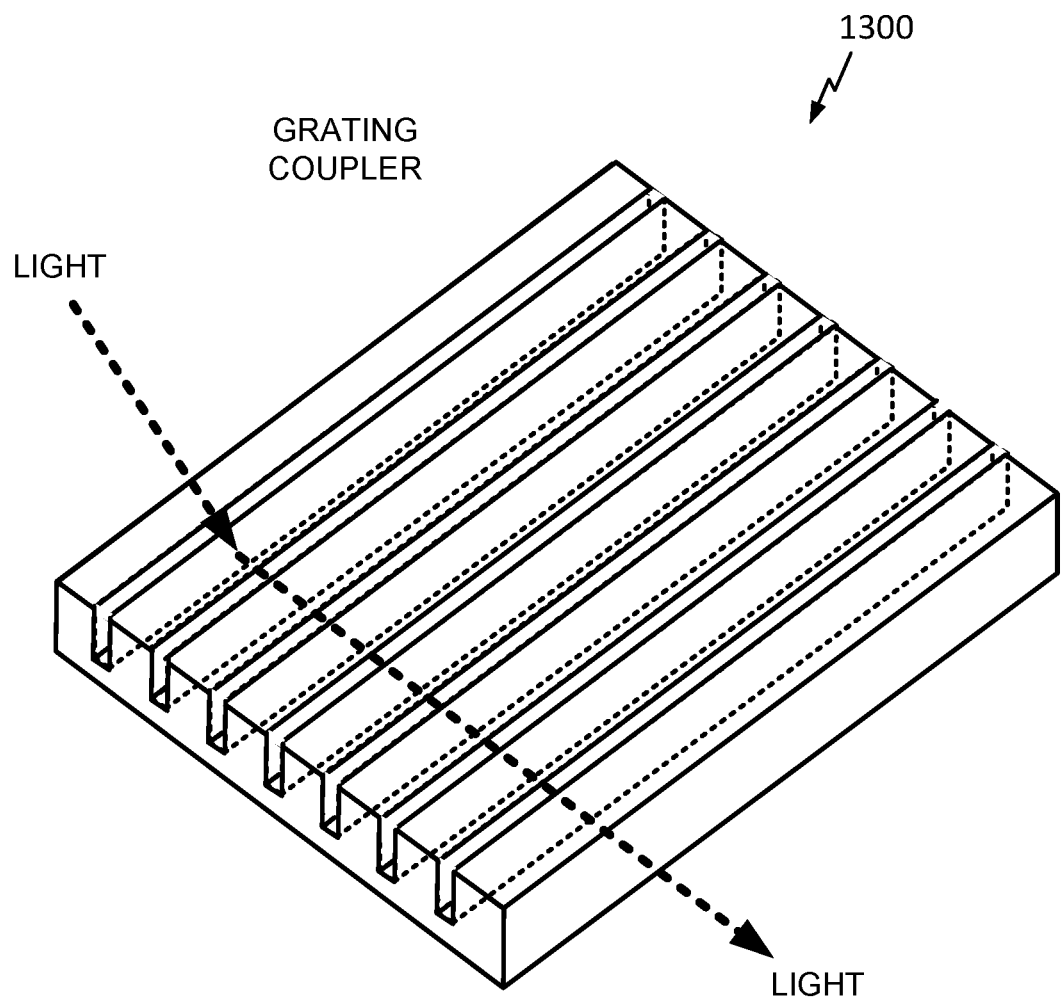
FIG. 13 illustrates a grating coupler in accordance with an embodiment of the disclosure.

FIG. 13 illustrates a detailed view of an exemplary grating coupler 1300. The grating coupler 1300 may be a detailed representation of any of the grating couplers described in the disclosure, such as the grating coupler 516 and/or the grating coupler 526. The grating coupler 1300 may be a means for optical coupling. The grating coupler 1300 may be used to direct light energy transmitted at an angle from a light source (e.g., laser, means for generating light energy) and towards a waveguide (e.g., means for transmitting light energy). The grating coupler 1300 includes a grating structure that can optically couple the light to a waveguide. The grating structure may include a series of alternating ridges and valleys with particular heights and widths. The height and width of the ridges and valleys, and the number of ridges and valleys, may vary with different implementations of the grating coupler 1300. The shape of the grating coupler may vary with different implementations. For example, the grating may be round, square, rectangular and/or elliptical.

Exemplary Sequence for Fabricating a Slider with Localized Annealing

FIG. 14 (which includes FIGS. 14A-14B) illustrates an exemplary sequence for providing or fabricating a slider with localized annealing. In some implementations, the sequence of FIGS. 14A-14B may be used to provide or fabricate any of the sliders described in the disclosure.

Figure 14A:
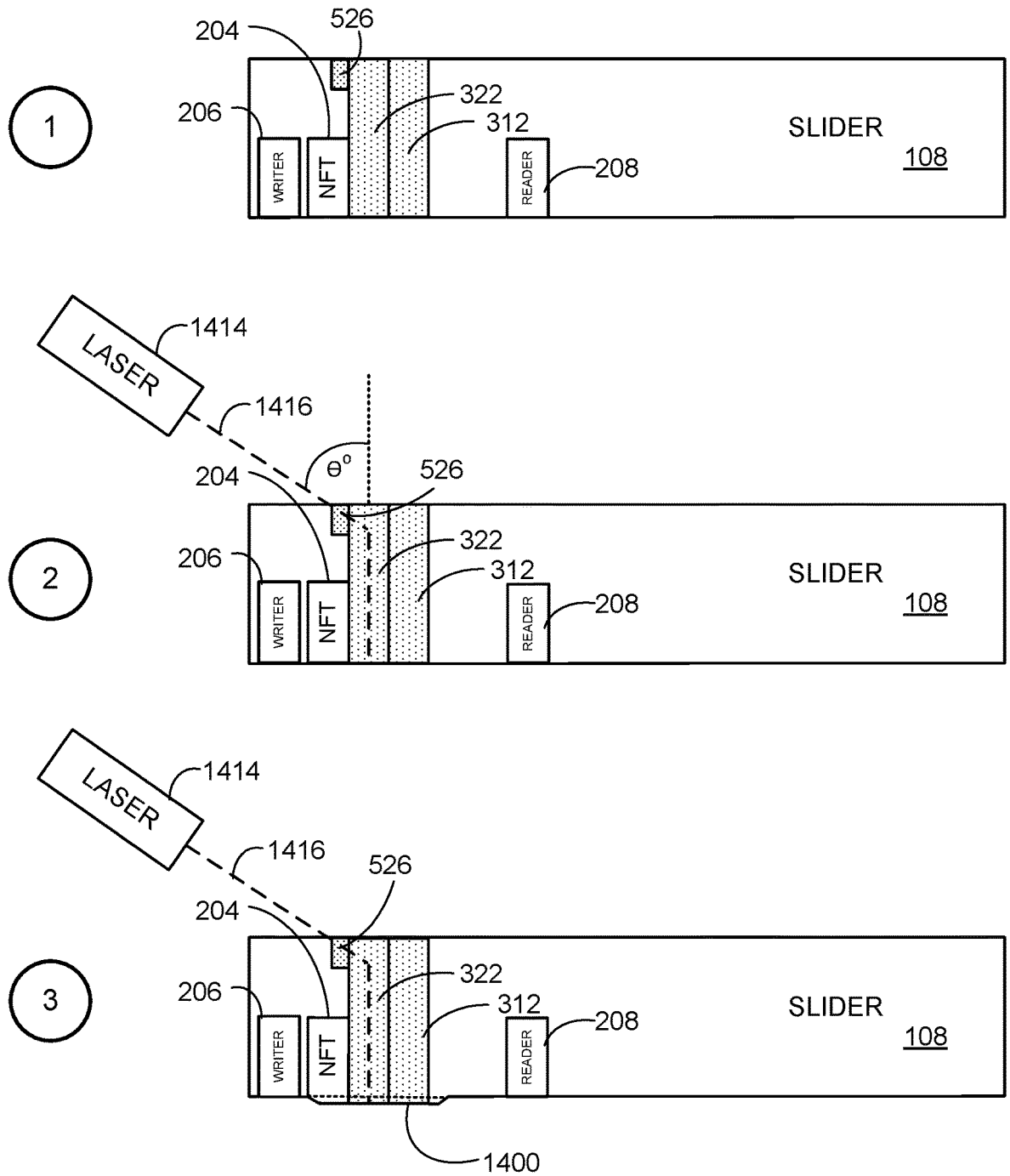
FIG. 14 (comprising FIGS. 14A-14B) illustrates an exemplary sequence for fabricating a slider with localized annealing.
Figure 14B:
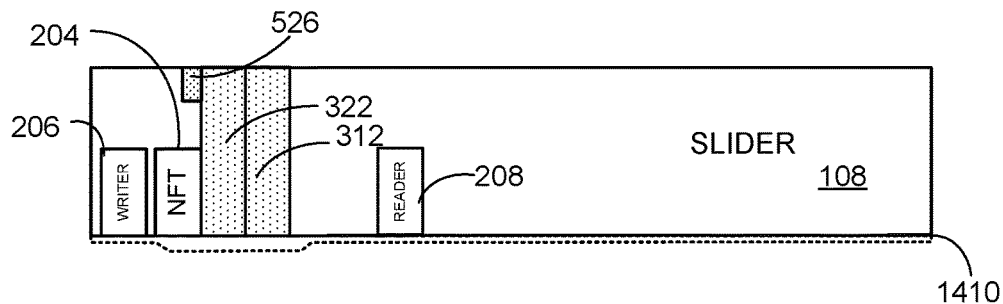
Figure 14B:
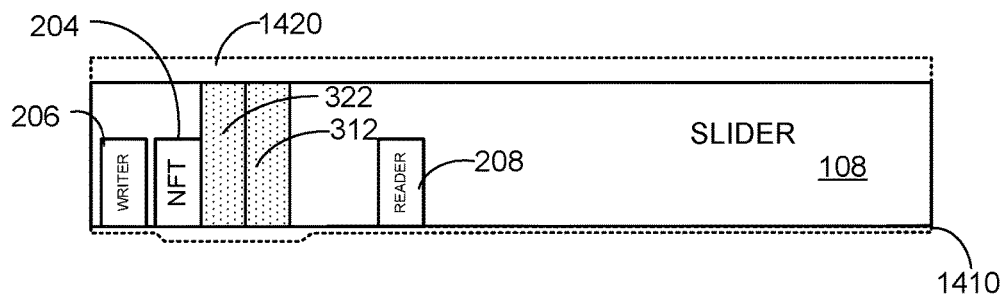
Figure 14B:
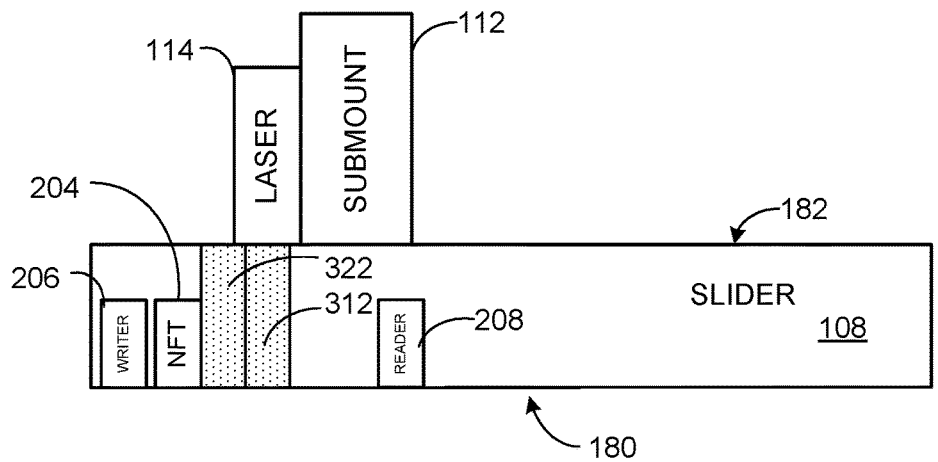

It should be noted that the sequence of FIGS. 14A-14B may combine one or more stages in order to simplify and/or clarify the sequence for providing or fabricating the slider. In some implementations, the order of the processes may be changed or modified. In some implementations, one or more of processes may be replaced or substituted without departing from the spirit of the disclosure. As will be further described below, the sequence of FIGS. 14A-14B may be performed at the wafer level, at the bar level or on singulated sliders.

Stage 1, as shown in FIG. 14A, illustrates a state after a slider 108 is provided. The slider 108 includes the waveguide 312 (e.g., first waveguide), the waveguide 322 (e.g., second waveguide), the grating coupler 526, the NFT 204, the writer 206 and the reader 208. The slider 108 may be a singulated (e.g., diced) slider. In some implementations, the slider 108 is part of a wafer that includes several sliders. In some implementations, the slider 108 may be part of a bar (e.g., row-bar) that includes several sliders. A bar of sliders may be a row or column of sliders cut from a wafer. The slider shown at stage 1 may be considered as a device component (e.g., magnetic transducer). The slider 108 may be on a support structure (not shown). Such a support structure (e.g., means for support, means for supporting device component) may be used to help position and hold the slider 108, a bar comprising sliders, and/or a wafer comprising sliders, in place during a process of localized annealing. As mentioned above, the terms first and second as used in the disclosure are used arbitrarily and are not necessarily indicative of an order. For example, the waveguide 312 may be considered as a first waveguide or a second waveguide, and the waveguide 322 may be considered as a first waveguide or a second waveguide.

Stage 2 illustrates a state when an external laser 1414 (e.g., external means for generating light energy), generates and transmits a light energy 1416 (e.g., laser beam) towards the grating coupler 526. The term "external laser" as used in the disclosure means a laser that is separate from the slider and/or separate from the disk drive that includes the slider. An external laser is a laser that coupled to an apparatus, device and/or system that is used to fabricate the slider. An external laser is different from a slider laser. A slider laser (e.g., laser 114) is a laser that is physically coupled (e.g., physically coupled through a mount or sub-mount) to a slider and used during an operation of the disk drive. In contrast, an external laser is used during the fabrication of the slider and is not used nor present when operating the disk drive that includes a slider. In some implementations, the external laser 1414 may generate a light energy of greater than 5 milliwatts (mW) (e.g., 5 mW to 40 mW). The power of the external laser 1414 may be such that the power of the light energy traveling through a waveguide is in a range of about 50% to 150% of the writing power used by the laser (e.g., 114, slider laser) that is used during an operation of the disk drive 100. In some implementations, there may be energy loss (e.g., coupling loss) when light energy travels from a grating coupler to a waveguide. As such, in order to have light energy that travels through the waveguide to be about 50% to 150% of the writing power used by a slider laser, the external laser may have to be able to generate a light energy that is greater than 150% of the writing power used by a slider laser. The external laser 1414 may generate a light energy with a wavelength of greater than 400 nanometers (nm). However, different implementations may use an external laser with different power ratings and that may generate light energy at different wavelengths. The angle at which the light energy is directed towards the grating coupler 526 or the waveguide may vary with different implementations. In some implementations, the incident angle (Θ) at which the light energy is directed towards the grating coupler is in a range of about 0 degrees and 90 degrees from a line that is perpendicular (e.g., line that is normal) to the surface of the slider (or surface of the wafer or row-bar that includes the slider). Different implementations may use different types of lasers. The laser may be a direct current (DC) laser and/or a pulsed laser.

The light energy 1416 travels through the grating coupler 526, the waveguide 322 and the NFT 204, where it begins to heat a local region of the slider 108. The local region that is being heated by the light energy 1416 may include a region along a first surface of the slider 108 that includes the waveguide 312, the NFT 204, the writer 206, the reader 208 and/or the waveguide 322. In some implementations, there may be an optional mode converter (e.g., mode converter 1016) that is coupled to the waveguide 322. The mode converter may be used in conjunction with or in lieu of the grating coupler. The light energy 1416 may travel through the mode converter before traveling through the waveguide 322. There may also be a mode converter coupled to the waveguide 312.

Stage 3 illustrates a state, after the slider 108 has been subjected to the light energy 1416 for a period of time. Different implementations may use different exposure time to the light energy. In some implementations, the slider 108 may be subject to at least 25 seconds of the light energy. In some implementations, the slider 108 may be subject to as much as 20 minutes of the light energy. In some implementations, the light energy 1416 may cause the region to reach temperatures in a range of about 200-700 Celsius. In some implementations, the temperature of the region may reach higher temperatures. The region that has been exposed to heat has been annealed, potentially changing the chemical and/or physical properties around the annealed region. As shown at stage 3, a portion 1400 of the slider 108 has expanded and protruded, such that portions of the waveguide 312, the waveguide 322, the NFT 204 and part of the slider 108 has protruded away from a first surface of the slider 108. It is noted that the protrusion may vary and affect different components and materials differently.

As mentioned above, the annealing process may affect components differently, depending on the materials and/or composition of the components and/or the type of external laser used. Annealing may affect grain size (e.g., grain growth), defects (e.g., annihilation of defect), oxidation, trapped gases and moisture (e.g., elimination of trapped gases and/or moistures), impurities, density, hardness, thermal conductivity, and/or electrical resistivity. In some implementations, the annealing process may cause one or more components to have (i) an increase in grain size (e.g., grain growth) by up to about 20 percent (e.g., 5-20 percent), (ii) a decrease in resistivity (e.g., electrical resistivity) in a range of about 10-30 percent, (iii) an increase in density in a range of about 10-20 percent, (iv) an increase in thermal conductivity in a range of about 10-30 percent, and/or (v) an increase in hardness in a range of about 10-30 percent.

Stages 2 and 3 is one example of how localized optical annealing on a slider may be performed. In some implementations, the light energy 1416 may travel through the waveguide 312, in addition or in lieu of the waveguide 322. For example, the external laser 1414 may direct the light energy 1416 towards the waveguide 312 which then travels towards the NFT 204. In another example, the light energy 1416 may travel through the waveguide 312 and the waveguide 322 before reaching the NFT 204. In yet another example, a grating coupler (e.g., grating coupler 516) may be coupled to the waveguide 312. In such an instance, the light energy 1416 may be directed to the grating coupler (e.g., 516) before traveling through the waveguide 312.

Stage 4, as shown in FIG. 14B, illustrates a state after portions the slider 108 has been removed. In particular, a portion 1410 of the slider 108 has been removed leaving a flat and smooth surface (e.g., ABS 180) as described in FIGS. 3-10. A lapping process (e.g., fine lapping) may be used to remove the portion 1410. A lapping process may include a polishing process. The process of removing the portion 1410 may include removing a bottom portion (e.g., first portion) of the waveguide 312, a bottom portion (e.g., first portion) of the waveguide 322, a bottom portion (e.g., first portion) of the NFT 204, a bottom portion (e.g., first portion) of the writer 206 and/or a bottom portion (e.g., first portion) of the reader 208. At a minimum, the process of removing the portion 1410 may include removing the portion 1400 of the slider 108. What is left behind is a region of the slider 108 that has been annealed, leaving that particular region tougher and more resistant to heat. For example, portions of the slider 108, the waveguide 312, the waveguide 322, the NFT 204, the writer 206 and/or the reader 208 are annealed, and thus tougher and more resistant to heat. The grain size of an annealed component may in a range of about 10-500 nanometers (nm). The ABS of an annealed component or/or an annealed portion of the slider, after lapping may have a circular pattern, a longitudinal pattern, a columnar pattern, an elliptical pattern, or combinations thereof.

Stage 5 illustrates a state after another portion 1420 of the slider 108 has been removed. In this implementation, a top portion (e.g., second portion) of the slider 108, a top portion (e.g., second portion) of the waveguide 312, a top portion (e.g., second portion) of the waveguide 322, and the grating coupler 526 have been removed. A lapping process (e.g., rough lapping) as described at stage 4, may be used to remove the portion 1420 of the slider 108. Different implementations may remove different portions of the top or upper portion of the slider 108. In some implementations, all or some portions of the grating coupler 526 may be left with the slider 108. Similarly, if a mode converter is present, all or some portions of the mode converter may be removed or left with the slider 108. In some implementations, removing the top or upper portion may be an optional process for fabricating the slider 108.

Stage 6 illustrates a state after the laser 114 and the sub-mount 112 have been coupled to the second surface 182 of the slider 108.

FIGS. 14A-14B illustrate an example of fabricating a slider with localized annealing. As mentioned above, the sequence shown in FIGS. 14A-14B may be used fabricated any of the sliders illustrated and described in the disclosure. Moreover, the sequence of FIGS. 14A-14B may be applied to a singulated slider, a bar that includes several sliders and/or a wafer that includes several sliders.

Figure 15:
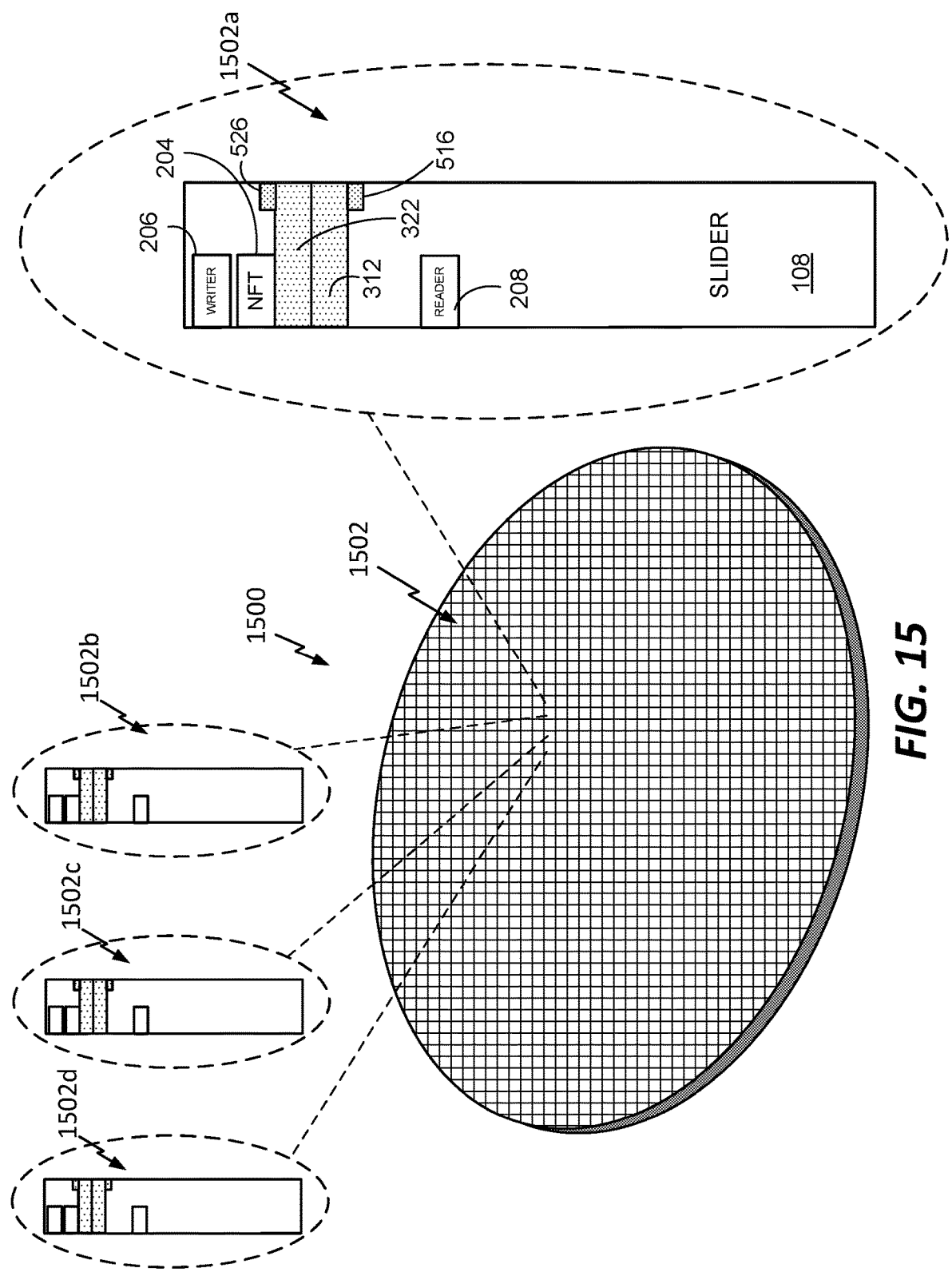
FIG. 15 illustrates wafer that includes several sliders with localized annealing.

FIG. 15 illustrates a wafer 1500 that includes several sliders 1502 (e.g., 1502a, 1502b, 1502c, 1502d). The sliders 1502 may be considered as magnetic transducers. The sliders 1502 may be device components that may represent any of the sliders described in the disclosure. As an example, a particular slider (e.g., magnetic transducer) from the sliders 1502 may include the slider 108, the waveguide 312, the waveguide 322, the grating coupler 516, the grating coupler 526, the NFT 204, the writer 206 and the reader 208. The wafer 1500 may be cut into bars (e.g., along a row or along a column, row bar) that includes several sliders. Similarly, the wafer 1500 may be singulated (e.g., diced) into individual sliders. The cutting of the wafer 1500 may be done before or after localized annealing.

Figure 16:
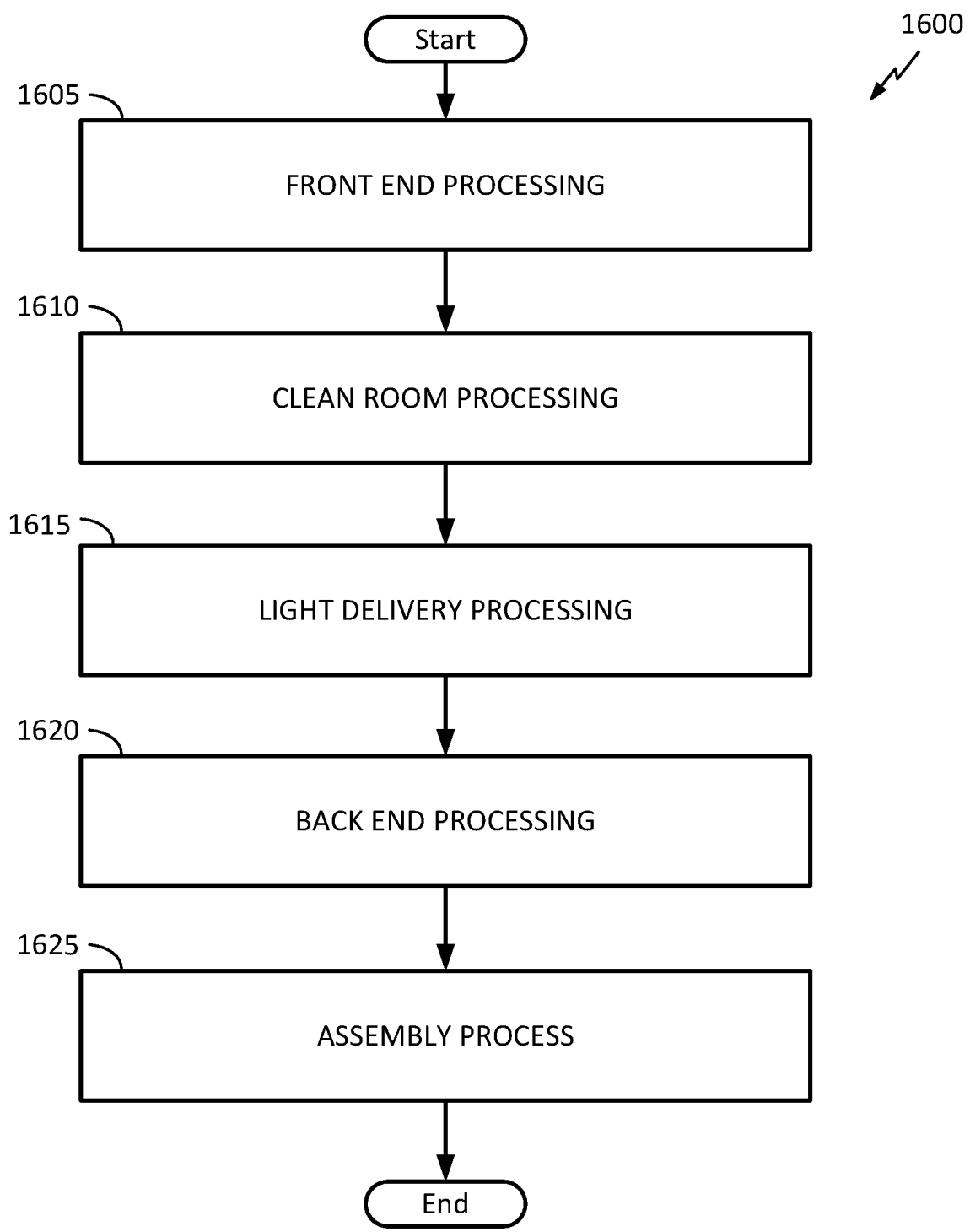
FIG. 16 illustrates an exemplary flow diagram of a method for fabricating a slider with localized annealing.

Exemplary Flow Diagram of a Method for Fabricating a Slider with Localized Annealing In some implementations, fabricating a slider with localized annealing includes several processes. FIG. 16 illustrates an exemplary flow diagram of a method 1600 for providing or fabricating a slider with localized annealing. The method 1600 of FIG. 16 may be used to provide or fabricate any of the sliders described in the disclosure.

It should be noted that the sequence of FIG. 16 may combine one or more processes in order to simplify and/or clarify the method for providing or fabricating a slider with localized annealing. In some implementations, the order of the processes may be changed or modified.

The method performs (at 1605) front end processing of a wafer (e.g., 1500) to fabricate several sliders (e.g., magnetic transducers). Front-end processing may include wafer load, wafer back grind, wafer sectioning. FIG. 15 may illustrate an example of a wafer 1500 after a front-end processing. As will be further described below, localized annealing may be performed during front-end processing. A more detailed description of front-end processing is further illustrated and described in FIG. 17.

The method performs (at 1610) clean room processing of the slider. Clean room processing may include providing a protective coating, tip preparation and photo etching of the slider.

The method performs (at 1615) light delivery processing of the slider. Light delivery processing may include a secondary tip preparation, coating and NFT stress testing of the slider.

The method performs (at 1620) back end processing of the slider. In some implementations, back end processing may include processing a wafer that includes the sliders. FIG. 15 may illustrate an example of a wafer 1500 after a back-end processing.

The method performs (at 1625) an assembly process of the slider. In some implementations, the assembly process may include integrated slider assembly (ISA) cleaning and head and gimbal assembly (HGA) cleaning. The assembly process of the slider may include coupling a slider laser (e.g., laser 114, laser chip) to a backside of the slider (e.g., magnetic head) that has been fabricated.

Having described a high-level method for fabricating a slider with localized annealing, a more detailed method for fabricating a slider with localized annealing is described below in FIG. 17.

Figure 17:
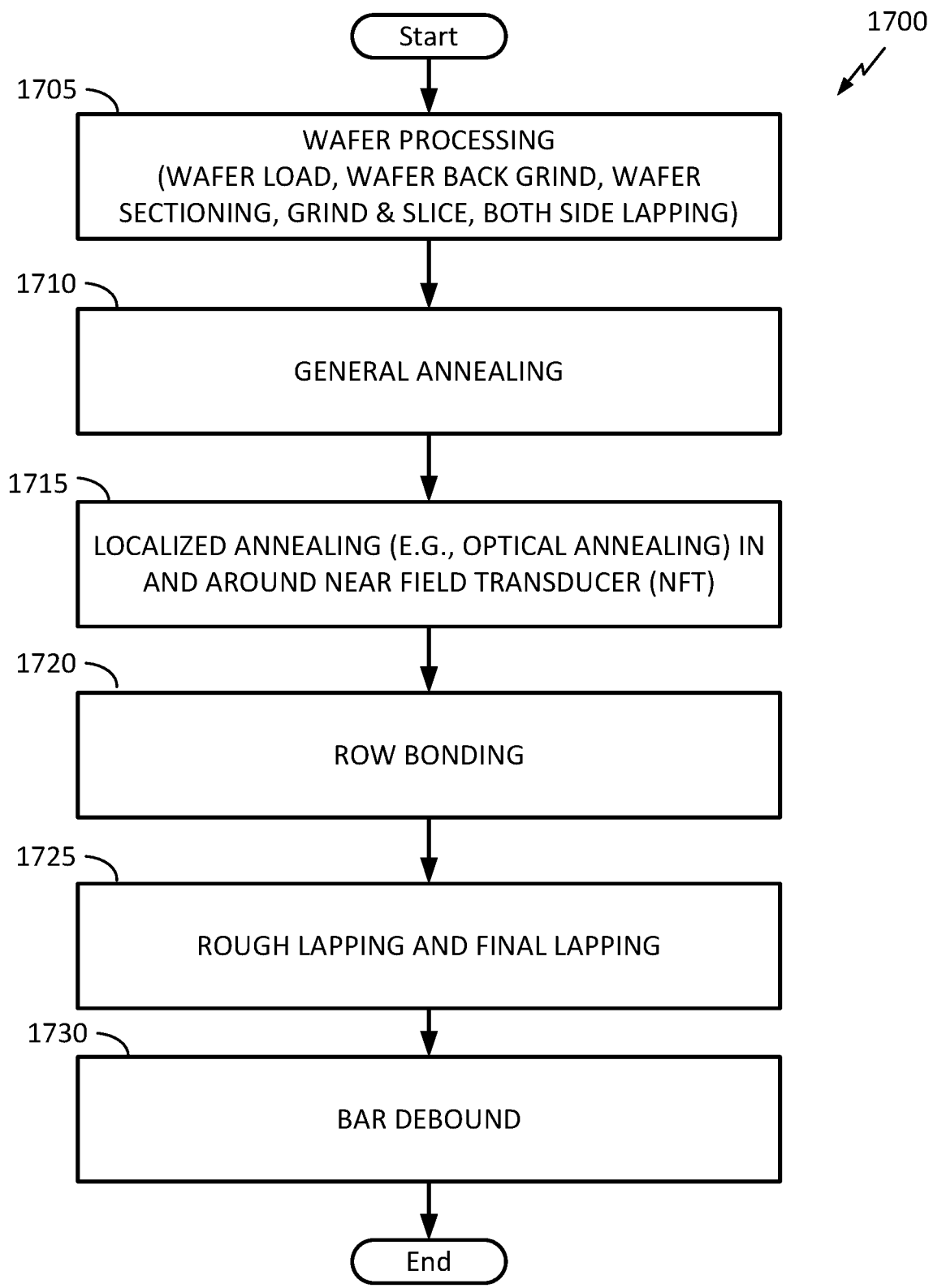
FIG. 17 illustrates an exemplary flow diagram of a method for front end processing of a slider that includes localized annealing.

FIG. 17 illustrates an exemplary flow diagram of a method 1700 for performing front-end processing of a wafer to fabricate a slider with localized annealing. The method 1700 may be performed during the front-end processing (at 1605) of FIG. 16 to provide or fabricate any of the sliders described in the disclosure.

It should be noted that the sequence of FIG. 17 may combine one or more processes in order to simplify and/or clarify the method for providing or fabricating a slider with localized annealing. In some implementations, the order of the processes may be changed or modified.

The method performs (at 1705) wafer processing. Wafer processing may include wafer loading, wafer back grind, wafer sectioning, grind and slice (e.g., singulating), wafer lapping). In some implementations, wafer processing may include forming components and parts on to form the sliders. Wafer processing may include providing and/or forming one or more waveguides, one or more coupling graters, a near field inductor (NFT), a writer and/or a reader, over a substrate (e.g., silicon). Wafer processing may include depositing one or more metal layers and etching.

The method performs (at 1710) general annealing of the wafer and/or the sliders. This may include baking the entire wafer or slider in an oven. General annealing is limited in terms of the temperature at which the slider can be heated. This is because some components of the slider may be sensitive to high heat.

The method performs (at 1715) localized annealing of the sliders. The localized annealing of the sliders may be optical annealing of portions of the sliders. In some implementations, the portion of the slider that is annealed is a region in and around the NFT and/or a waveguide. An example of localized annealing of a slider is illustrated and described in FIGS. 14A-14B. The localized annealing may be done at the wafer level, at the bar level or at a singulated slider level. As mentioned above, localized annealing toughens and strengthens regions of the slider 108 to be more resistant to heat and deformation. Localized annealing can heat the portion of the slider at a much higher temperature than general annealing in an oven. Since the localized annealing is only focusing the annealing to a particular region of the slider, components of the slider that are sensitive to high heat or high temperature are not affected by the localized heating.

The method may perform (at 1720) row bonding. In some implementations, the wafer is cut into bars of sliders during the wafer processing (at 1705). The method may bond these cut bars using pressure and/or an adhesive. However, if the wafer has not been cut (at 1705), row bonding may be unnecessary.

The method performs (at 1725) rough lapping and final lapping. As mentioned above, lapping may include remove portions of the sliders (e.g., removing upper portions, removing lower portions). A lapping process may include polishing the sliders. A lapping process may include removing portions of the slider that have been annealed. An example of lapping is described in FIG. 14B.

The method uncouples (at 1730) the bars. However, if the wafer has not been cut into bars, the method may cut the wafer into bars (e.g., using a saw, using laser, using a chemical process).

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

Various components described in this specification may be described as "including" or made of certain materials or compositions of materials. In one aspect, this can mean that the component consists of the particular material(s). In another aspect, this can mean that the component comprises the particular material(s).

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1.

What is claimed is:

1. A system for optically annealing a slider configured for heat assisted magnetic recording (HAMR), the system comprising:
    a support structure configured to retain a slider, the slider comprising:
        a writer for writing data to a HAMR medium;
        a reader for reading data stored on the HAMR medium;
        a near field transducer (NFT);
        first means for transmitting light energy, wherein the first means for transmitting light energy is optically coupled to the NFT;
        means for generating a first light energy, wherein the means for generating the first light energy is configured to generate and transmit the generated first light energy to the first means for transmitting light energy such that the NFT causes a portion of the HAMR medium to heat up;
        second means for transmitting light energy, wherein the second means for transmitting light energy is optically coupled to the NFT; and
        means for optical coupling coupled to the second means for transmitting light energy; and
    external means for generating light energy, wherein the external means for generating the light energy is configured to generate and transmit the generated light energy to the means for optical coupling, such that the generated light energy travels through the second means for transmitting light and to the NFT, where the generated light energy is sufficient to anneal the NFT.

2. The system of claim 1, wherein the slider further comprises a splitter coupled to the first means for transmitting light energy and the second means for transmitting light energy.

3. The system of claim 1, wherein the slider is one of a plurality of sliders disposed in a wafer.

4. The system of claim 1, wherein the slider is one of a plurality of sliders disposed in a row-bar.

5. The system of claim 1, wherein the generated light energy from the external means for generating light energy has a power of at least 5 milliwatts (mW).

6. The system of claim 1, wherein the generated light energy from the external means for generating light energy has a wavelength of at least 400 nanometers (nm).

7. The system of claim 1, wherein the slider further includes another means for optical coupling that is coupled to the first means for transmitting light energy.

8. The system of claim 1, wherein the first light energy from the means for generating a first light energy is directed towards the means for optical coupling.

9. The system of claim 8, wherein an angle at which the first light energy impinges the means for optical coupling, positioned along a surface of the slider, is in a range of about 0 degrees and 90 degrees from a line normal to the surface.

10. A method for optically annealing a slider, the method comprising:
    providing a slider, wherein the slider comprises:
        a writer for writing data to a heat assisted magnetic recording (HAMR) medium;
        a reader for reading data stored on the HAMR medium;
        a near field transducer (NFT);
        a first waveguide optically coupled to the NFT;
        a slider laser configured to generate and transmit a first light energy to the first waveguide such that the NFT causes a portion of the HAMR medium to heat up, to assist the writer for writing data to the HAMR medium; and
        a second waveguide optically coupled to the NFT; and
    generating and transmitting, from an external laser, a light energy to the second waveguide, such that the generated light energy travels to the NFT, and where the generated light energy anneals the NFT.

11. The method of claim 10, further comprising removing at least part of the annealed NFT.

12. The method of claim 10, wherein the generated light energy from the external laser has a power of at least 5 milliwatts (mW).

13. The method of claim 10, wherein the generated light energy from the external laser has a wavelength of at least 400 nanometers (nm).

14. The method of claim 10, wherein the slider further comprises a grating coupler optically coupled to the second waveguide.

15. The method of claim 14,
    wherein generating and transmitting, from an external laser, comprises generating and transmitting the light energy to the grating coupler, such that the generated light energy travels through the second waveguide and to the NFT, and
    wherein an angle at which the first light energy hits the grating coupler is in a range of about 0 degrees and 90 degrees from a line that is perpendicular to a surface of the slider.

16. A slider for heat assisted magnetic recording (HAMR), the slider comprising:
    a writer for writing data to a HAMR medium;
    a reader for reading data stored on the HAMR medium;
    a near field transducer (NFT) configured to cause a portion of the HAMR medium to heat up when a first light energy is received, to assist the writer for writing data to the HAMR medium, wherein the NFT includes an annealed portion that has a grain size that is about 5 to 20 percent greater than a non-annealed NFT of the same composition;

a first waveguide optically coupled to the NFT; and a second waveguide optically coupled to the NFT, for transmitting a light energy from an external laser to the NFT to optically anneal the NFT during a fabrication process of the slider.

17. The slider of claim 16, further comprising a grating coupler optically coupled to the second waveguide.

18. The slider of claim 16, wherein slider is one of a plurality of sliders disposed in a form factor selected from the group consisting of a row-bar and a wafer.

19. The slider of claim 16, further comprising a slider laser configured to generate and transmit the first light energy to the first waveguide such that the NFT emits heat to a portion of the HAMR medium to assist the writer for writing data to the HAMR medium.

20. The slider of claim 16, wherein the annealed portion of the NFT has (i) an electrical resistivity that is about 10 to 30 percent lower than a non-annealed NFT of the same composition, (ii) a density that is about 10 to 20 percent that is greater than a non-annealed NFT of the same composition, (iii) a thermal conductivity that is about 10 to 30 percent greater than a non-annealed NFT of the same composition, and/or (iv) a hardness that is about 10 to 30 percent greater than a non-annealed NFT of the same composition.

* * * * *